(12) United States Patent
Han et al.

(10) Patent No.: US 8,581,515 B2
(45) Date of Patent: Nov. 12, 2013

(54) LIGHT EMITTING DIODE DRIVER

(75) Inventors: Dae Hoon Han, Gyunggi-do (KR); Jeong In Cheon, Seoul (KR); Jae Shin Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 156 days.

(21) Appl. No.: 13/117,691

(22) Filed: May 27, 2011

(65) Prior Publication Data

US 2012/0146530 A1 Jun. 14, 2012

(30) Foreign Application Priority Data

Dec. 13, 2010 (KR) ........................ 10-2010-0126900

(51) Int. Cl.
*H05B 37/02* (2006.01)
*G05F 1/00* (2006.01)

(52) U.S. Cl.
USPC ........ 315/297; 315/185 R; 315/192; 315/247; 315/287; 315/219; 363/15; 363/16; 363/18; 323/285; 323/224

(58) Field of Classification Search
USPC ............. 315/122, 152, 165, 197, 185 R, 192, 315/219, 247, 287, 297; 363/15, 18, 16, 363/21.02, 25, 49; 323/224, 283, 285, 287
See application file for complete search history.

(56) References Cited

U.S. PATENT DOCUMENTS

| | | | |
|---|---|---|---|
| 5,768,111 A * | 6/1998 | Zaitsu | 363/15 |
| 7,193,866 B1 | 3/2007 | Huang | |
| 8,014,176 B2 * | 9/2011 | Melanson et al. | 363/21.02 |
| 2010/0020569 A1 | 1/2010 | Melanson et al. | |
| 2010/0164403 A1 * | 7/2010 | Liu | 315/297 |
| 2010/0177127 A1 | 7/2010 | Akiyama et al. | |
| 2010/0237799 A1 | 9/2010 | Choi et al. | |
| 2011/0037407 A1 * | 2/2011 | Ahn et al. | 315/287 |
| 2011/0062872 A1 * | 3/2011 | Jin et al. | 315/122 |
| 2011/0128303 A1 * | 6/2011 | Yonemaru et al. | 345/690 |
| 2011/0148319 A1 | 6/2011 | Terazawa | |
| 2012/0019156 A1 * | 1/2012 | Jin | 315/187 |

FOREIGN PATENT DOCUMENTS

| | | |
|---|---|---|
| JP | 3126122 U | 10/2006 |
| JP | 2010-057331 A | 3/2010 |
| JP | 2010514195 A | 4/2010 |
| JP | 2010153599 A | 7/2010 |
| JP | 2010161264 A | 7/2010 |
| JP | 2011009701 A | 1/2011 |
| KR | 1020090028287 A | 3/2009 |
| WO | 2008075389 A1 | 6/2008 |

OTHER PUBLICATIONS

Office Action issued in corresponding Korean Patent Application No. 10-2010-0126900 dated Oct. 15, 2012.
Japanese Office Action dated May 21, 2013 issued in Patent Application No. 2011-232164.

* cited by examiner

*Primary Examiner* — Vibol Tan
(74) *Attorney, Agent, or Firm* — Lowe Hauptman & Ham, LLP

(57) ABSTRACT

The present invention relates to a light emitting diode driver that integrates a light emitting diode control function and a power switching control function at a secondary side insulated from a primary side in a power supply circuit, without using a photo coupler to control power switching at the primary side.

28 Claims, 11 Drawing Sheets

LIGHT EMITTING DIODE DRIVER

CROSS-REFERENCE TO RELATED APPLICATIONS

This application claims the priority of Korean Patent Application No. 10-2010-0126900 filed on Dec. 13, 2010, in the Korean Intellectual Property Office, the disclosure of which is incorporated herein by reference.

BACKGROUND OF THE INVENTION

1. Field of the Invention

The present invention relates to a light emitting diode driver capable of driving a light emitting diode by converting a commercial power supply into a driving power supply.

2. Description of the Related Art

Recently, in the area of displays, a display device mainly using a cathode ray tube (CRT) has been replaced with a high-resolution large flat panel display (FPD) device, reflecting users' demands.

In particular, in the case of a large display device, demand for a liquid crystal display (LCD) has been remarkably increased due to the advantages of slimness and lightness thereof, which will solidify an LCD's leading position in terms of price and marketability in the future.

Meanwhile, in the case of an existing liquid crystal display device, a cold cathode fluorescent lamp (CCFL) has mainly been used as a backlight light source. However, the use of a light emitting diode (LED) is gradually being increased due to various advantages such as power consumption, lifespan, environmental-friendliness, efficiency, or the like.

In order to drive the light emitting diode, a power supply circuit converting commercial alternating current (AC) power into direct current (DC) power and a driving circuit controlling a supply of DC power to the light emitting diode have generally been used. The power supply circuit may be divided into a primary side and a secondary side, based on a transformer, in order to enhance an insulating function. The primary side is configured as a circuit rectifying and smoothing the commercial AC power to switch a power supply and a secondary side is configured as a circuit rectifying power transformed by the transformer and controlling the supply of the rectified power to a load. Generally, the primary side is provided with a power switching control circuit and a secondary side is provided with the driving circuit. In this case, in order to smoothly control the switching of a power supply, the power state supplied to the light emitting diode may be fed back to a power switching control circuit to control the switching based on the fed-back power state. To this end, a plurality of photo couplers including an insulating function to transfer a feedback current, have mainly been used. However, since the photo coupler is an optical device, signal transfer characteristics depend on photons, used time, and junction temperature, such that it is difficult to design a circuit and manufacturing costs may be increased due to the use of the photo coupler.

SUMMARY OF THE INVENTION

An aspect of the present invention provides a light, emitting diode driver that integrates a light emitting diode control function and a power switching control function at a secondary side insulated from a primary side in a power supply circuit to thereby control power switching of the primary side.

According to an aspect of the present invention, there is provided a light emitting diode driver, including: a power supplier including a primary side and a secondary side electrically insulated from each other, switching input power at the primary side and converting the switched power into driving power having a previously set voltage level at the secondary side, and supplying the driving power to at least one light emitting diode (LED) channel; a driver controlling a supply and an interruption of the driving power to the at least one LED channel from the power supplier to drive the at least one LED channel and controlling switching of the power supplier according to a state of the driving power supplied to the at least one LED channel; and a transfer unit transferring a switching control signal controlling the switching of the power supplier from the driver to the primary side of the power supplier from the secondary side thereof.

The driver may include a switching unit connected between the at least one LED channel and a ground to switch the supply or interruption of the driving power to the at least one LED channel; and a controller detecting the state of the driving power supplied to the at least one LED channel to control the switching of the switching unit and generating the switching control signal according to the state of the detected driving power and to transfer the generated switching control signal to the transfer unit.

The controller may include: a current generator generating current set according to the state of the detected driving power; a clock generator generating a clock signal having a period set according to the current generated by the current generator; a dead time generator generating a dead time of the clock signal generated by the clock generator according to the current generated by the current generator; a gate driver processing the clock signal having the dead time generated by the dead time generator to control the switching of the power supplier and transferring the processed clock signal to the transfer unit; a dimming unit controlling the switching of the switching unit according to the state of the detected driving power to control luminance of the at least one LED channel; and a protection unit interrupting an operation of the gate driver when the state of the detected driving power corresponds to a previously set abnormal operation.

The dimming unit may include: a calculator receiving the state of the detected driving power as a detection signal to calculate a current control signal transferred to the current generator when a pulse width modulation (PWM) signal turning-on and turning-off the switching unit is a high signal; and a buffer unit, controlling a voltage level of the detection signal to a previously set voltage level when the PWM signal is a low signal. The transfer unit may be a pulse transformer including a first winding that receives the switching control signal from the gate driver and a second winding that is electrically insulated from the first winding and receives the switching control signal input to the first winding to transfer the received switching control signal to the power supplier.

The light emitting diode driver may further include a rectifier rectifying the driving power from the power supplier and supplying the rectified driving power to the at least one LED channel.

The power supplier may supply the driving power to each of first and second LED channels of at least one LED channel block having the first and second LED channels.

The light emitting diode driver may further include a current balance unit having at least one current balance unit element that maintains current balance in the driving power supplied to each of the first and second LED channels.

The at least one current balance unit element may include: a current balance capacitor maintaining current balance between the driving power transferred to each of the first and second LED channels according to a charge balance law; first and second diodes connected between the first LED channel and a ground in series to rectify the driving power; third and fourth diodes connected between the second LED channel and the ground in series to rectify the driving power; a first stabilization capacitor connected to the first, and second, diodes in parallel to stabilize the driving power supplied to the first LED channel; and a second stabilization capacitor connected to the third and fourth diodes in parallel, to stabilize the driving power supplied to the second LED channel. The at least one current balance unit element may include; a current balance capacitor connected to one end of the secondary winding to maintain current balance between the driving power transferred to each of the first and second LED channels, according to a charge balance law; a first diode connected between the other end of the secondary winding and the first LED channel to rectify the driving power; a second diode connected between the current balance capacitor and the second LED channel to rectify the driving power; a first stabilization capacitor connected to the first LED channel in parallel to stabilize the driving power; and a second stabilization capacitor connected to the second LED channel in parallel to stabilize the driving power. The secondary winding is separated into a previously set turn number based on a center rap, the first LED channel and the second LED channel are connected in series, and the at least one balance unit element includes: a current balance capacitor connected to the center tap of the secondary winding and connected to a connection point of the first and second LED channels to maintain the current balance between the driving power transferred to the first and second LED channels, respectively; a first diode connected between one end of the secondary winding and the first LED channel to rectify the driving power; a second diode connected between, the other end of the secondary winding and the second LED channel to rectify the driving power; a first stabilization capacitor connected to the first LED channel in parallel to stabilize the driving power; and a second stabilization capacitor connected, to the second LED channel in parallel, to stabilize the driving power.

The power supplier may include; a rectifying and smoothing unit rectifying and smoothing commercial power; a power factor correction unit adjusting a phase difference between voltage and current of the rectified power from the rectifying and smoothing unit; a switching unit switching power of which power factor is corrected from the power factor correction unit according to the switching control signal; and a transformer having at least one primary winding that receives the switched power from the switching unit and at least one secondary winding that is insulated from the at least one primary winding and receives the power from the at least one primary winding by forming a previously set turn ratio.

The transformer may include a plurality of secondary windings, the secondary windings respectively connected to a plurality of LED channel blocks, and supplying the driving power to a corresponding LED channel block, and the current balance unit including the current balance unit element provided in plural, to maintain the driving power from the plurality of secondary windings in a current balance state and supply the current balanced driving power to the first LED channel and the second LED channel of a corresponding LED channel block.

The transformer may include a plurality of primary windings respectively corresponding to the plurality of secondary windings.

BRIEF DESCRIPTION OF THE DRAWINGS

The above and other aspects, features and other advantages of the present, invention will be more clearly understood from the following detailed, description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
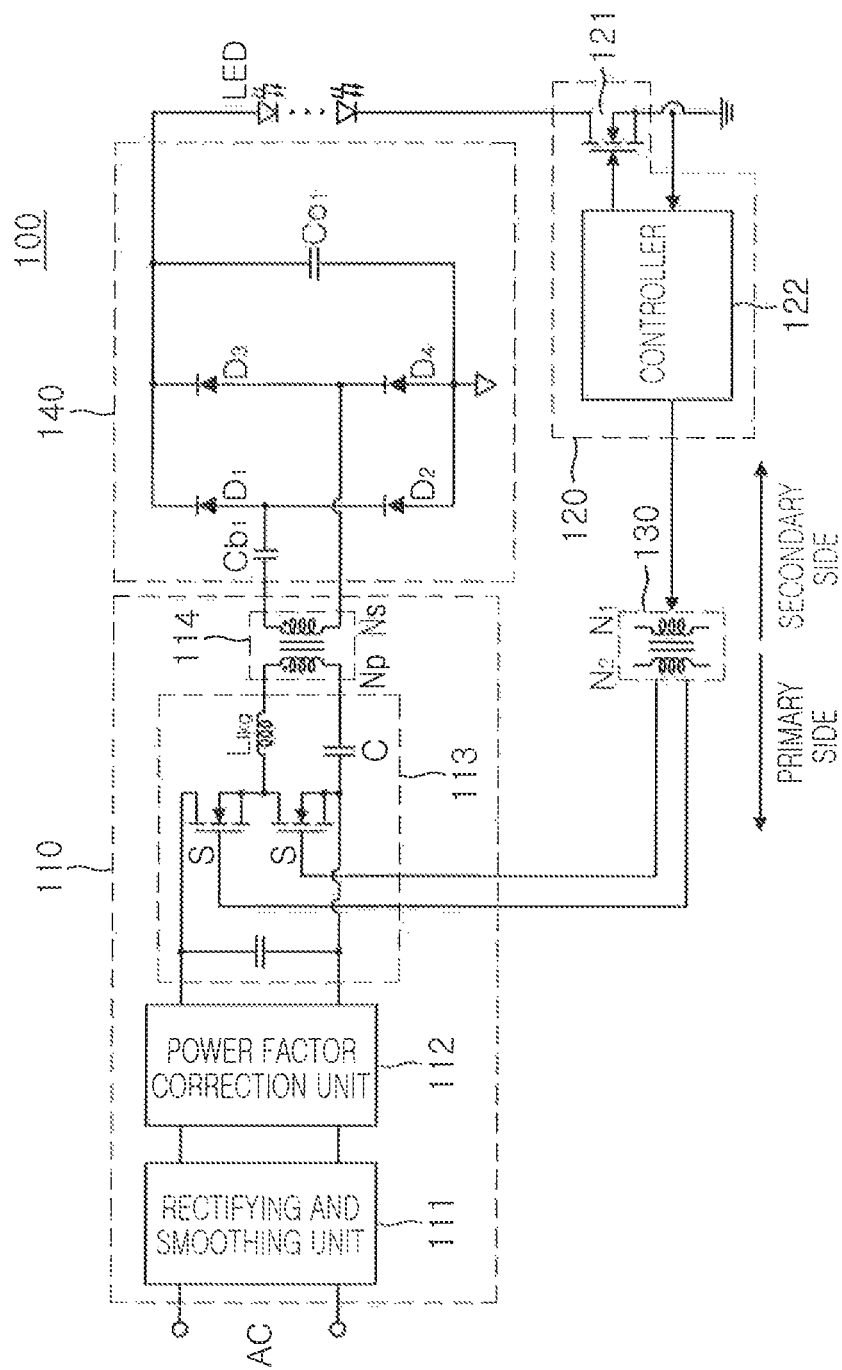
FIG. 1 is a schematic configuration diagram of a light emitting diode driver according to a first exemplary embodiment of the present invention.

FIG. 1 is a schematic configuration diagram of a light emitting diode driver according to a first exemplary embodiment of the present invention.

Referring to FIG. 1, a light emitting diode driver 100 according to a first exemplary embodiment of the present invention may be configured to include a power supplier 110, a driver 120, a transfer unit 130, and a rectifier 140.

The power supplier 110 may be configured to include a rectifying and smoothing unit 111 receiving commercial AC power, and rectifying and smoothing the received commercial AC power, a power factor correction unit 112 adjusting a phase difference between voltage and current of power rectified in the rectifying and smoothing unit 111, and correcting power factor, a switching unit 113 switching power of which the power factor is corrected in the power factor correction unit 112, and a transformer 114 changing a voltage level of power switched by the switching unit 113. Although not shown in FIG. 1, the power supplier 110 may further include an electromagnetic interference (EMI) filter in order to remove EMI.

Figure 5A:
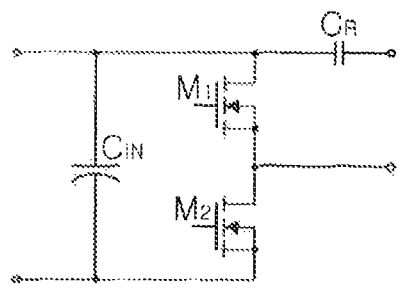
FIGS. 5A to 5C are schematic configuration diagrams of examples of a switching unit used in the light emitting diode driver of the exemplary embodiment of the present invention.
Figure 5B:
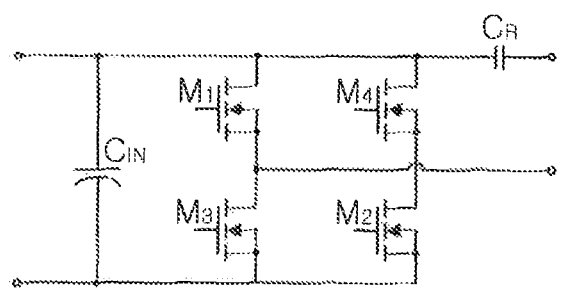
Figure 5C:
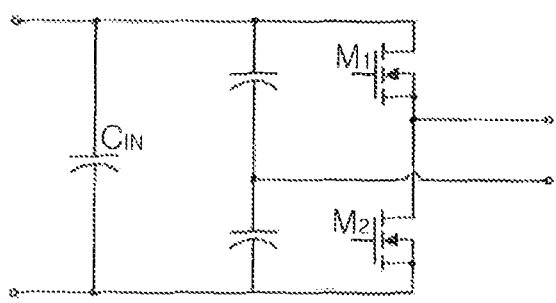

The switching unit 113 may be configured to include an LLC resonance inverter connected to two switches alternately switching the power of which the power factor is corrected in the power factor correction unit 112 and having leakage inductance $L_{lkg}$ and resonance capacitor C. However, as shown in FIGS. 5A to 5C, examples of the switching unit 113 used in the light emitting diode driver 100 according to the first exemplary embodiment of the present invention may be configured to include a half bridge inverter (FIG. 5A), a full-bridge inverter (FIG. 5B), or a push-pull inverter (FIG. 5C), or the like.

The transformer 114 may be configured to include at least one primary winding Np and at least one secondary winding Ns. The primary winding Np receives power switched by the switching unit 113 and the secondary winding Ns is electrically insulated, from the primary winding Np and receives the power inputted to the primary winding Np according to a preset turn ratio with the primary winding Np to transform the voltage level. The transformed power may be transferred to at least one light emitting diode channel LED in which a plurality of light emitting diodes are connected in series.

The driver 120 may include a switching unit 121 and a controller 122.

The switching unit 121 is connected to the light emitting diode channel LED to be turned-on and turned-off according to a dimming signal, such that the driving power is supplied or is not supplied to the light emitting diode channel LED.

The controller 122 controls the turn-on and turn-off of the switching unit 121 according to the state of the power supplied to the light emitting diode channel LED and controls the switching of the switching unit 113, thereby controlling the voltage level or the current level of the power supplied to the light emitting diode channel LED.

The transfer unit 130 transfers the switching control signal from the controller 122 to the switching unit 113 in a magnetic induction method. To this end, the transfer unit 130 may be configured to include a pulse transformer including a first winding N1 and a second winding N2. The first winding N1 and the second winding N2 are electrically insulated from each other. The first winding N1 receives the switching control signal from the controller 122 and the second winding N2 may transfer the switching control signal S magnetically induced from the first winding N1 electrically insulated from the second winding N2.

The rectifier 140 may be configured to include a capacitor Cb1, first to fourth diodes D1 to D4, and a stabilization capacitor Co1 and may rectify and stabilize power from the secondary winding Ns of the transformer 114 to supply the driving power to the light emitting diode channel LED. As shown, one end of the capacitor Cb1 may be connected to one end of the secondary winding Ns, first and second diodes D1 and D2 may be connected to each other in series, and the other end of the capacitor Cb1 may be connected to a connection point of the first and second diodes D1 and D2. Third and fourth diodes D3 and D4 may be connected to each other in series and may be connected to the first and second diodes D1 and D2 in parallel, the other end of the secondary winding Ns may be connected to the connection point of the third and fourth diodes D3 and D4, and the stabilization capacitor Co1 may be connected to the third and fourth diodes D3 and D4 in parallel.

As described above, the rectifying and smoothing unit 111, the power factor correction unit 112, the switching unit, the primary winding Np of the transformer 114, and the secondary winding N2 of the transfer unit 130 may be formed at the primary side and the driver 120, the rectifier 140, the secondary winding Ns of the transformer 114, and the first winding N1 of the transfer unit 130 may be formed, at the secondary side. Therefore, a function of controlling the switching of the primary side and a function of driving the light emitting diode of the secondary side may be formed to be integrated at the secondary side.

Figure 2:
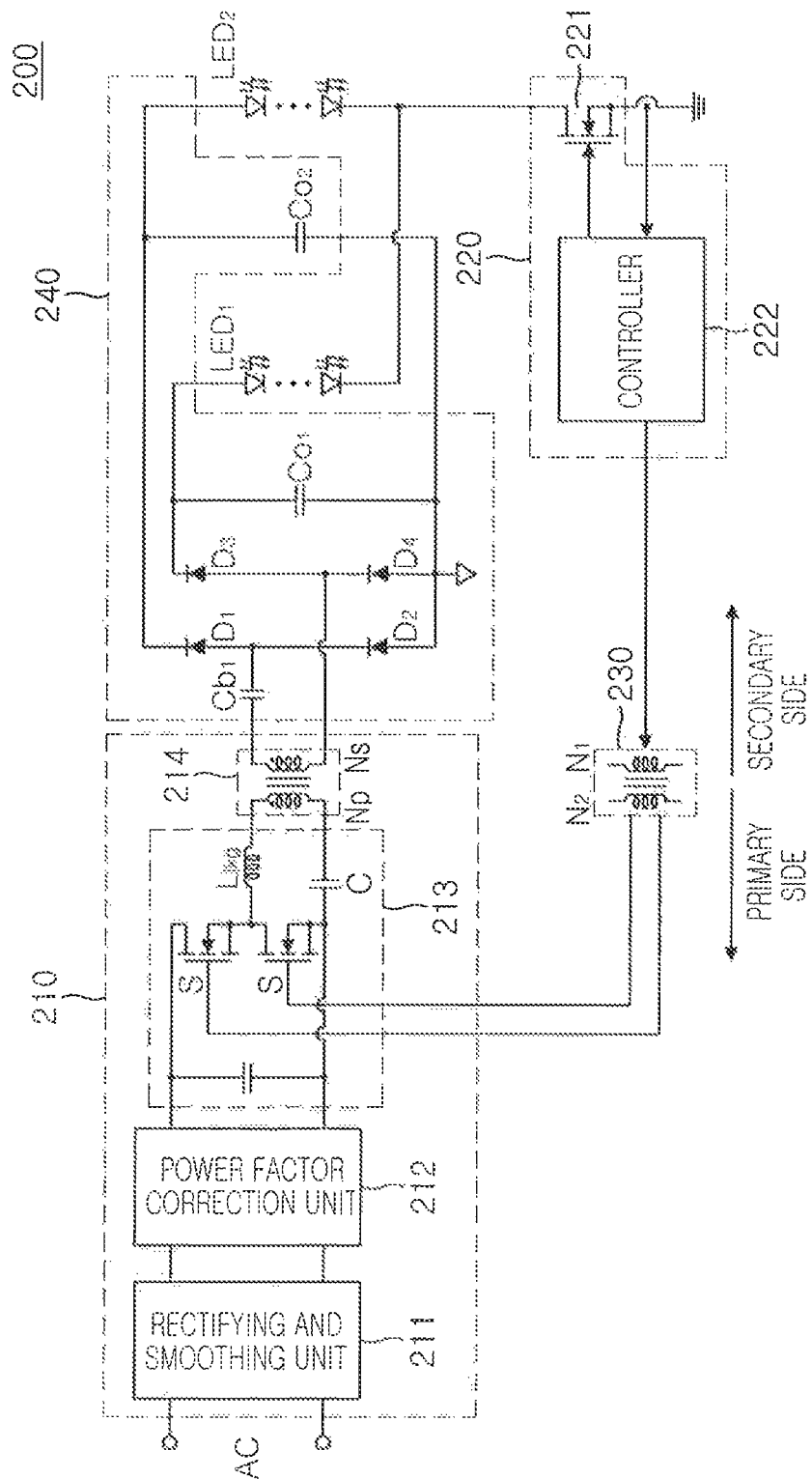
FIG. 2 is a schematic configuration diagram of a light emitting diode driver according to a second exemplary embodiment of the present invention.

FIG. 2 is a schematic configuration diagram of a light emitting diode driver according to a second exemplary embodiment of the present invention;

Referring to FIGS. 1 and 2, a light emitting diode driver 200 according to a second exemplary embodiment of the present invention may supply the driving power to at least two light emitting diode channels LED1 and LED2. Therefore, the light emitting diode driver 200 according to the second exemplary embodiment of the present invention, may be configured to include a current balance unit 240 unlike the rectifier of FIG. 1.

The current balance unit 240 may be configured to include the current balance capacitor Cb1, the first to fourth diodes D1 to D4, and the first and second stabilization capacitors Co1 and Co2. As shown, one end of the current balance capacitor Cb1 may be connected to one end of the secondary winding Ns, first and second diodes D1 and D2 may be connected to each other in series, the other end of the capacitor Cb1 may be connected to the connection point of the first and second diodes D1 and D2, and the second stabilization capacitor Co2 may be connected to the first and second diodes D1 and D2 in parallel. The third and fourth diodes D3 and D4 may be connected to each other in series, the other end of the secondary winding Ns may be connected to the connection point of the third and fourth diodes D3 and D4, and the first stabilization capacitor Co1 may be connected to the third and fourth diodes D3 and D4 in parallel.

The current balance capacitor Cb1 may maintain the current balance between the driving power supplied to the first light emitting diode channel LED1 and the driving power supplied to the second light emitting diode channel LED2 according to a charge average principle. The detailed description thereof will be described in detail with reference to FIGS. 12A and 12B.

Meanwhile, the configuration and function of the rectifying and smoothing unit 211, the power factor correction unit 212, the switching unit 213, and the transformer 214 in the power supplier 210, the driver 220 having the controller 222, and the transfer unit 230 are the same as the description of FIG. 1 and therefore, the detailed description thereof will be omitted.

Figure 3:
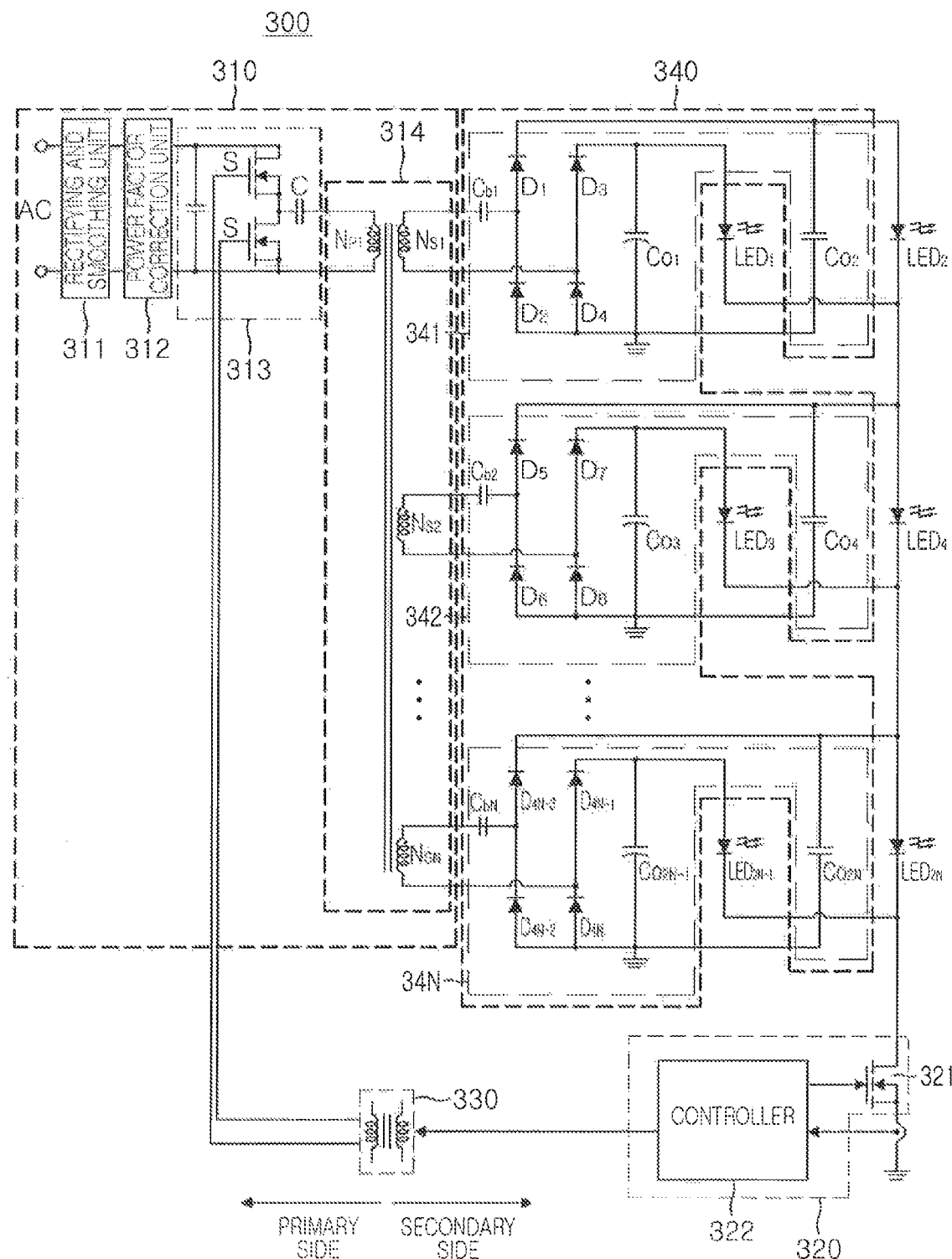
FIG. 3 is a schematic configuration diagram of a light emitting diode driver according to a third exemplary embodiment of the present invention.

FIG. 3 is a schematic configuration diagram of a light emitting diode driver according to a third exemplary embodiment of the present invention.

Referring to FIG. 3, in a light emitting diode driver 300 according to a third exemplary embodiment of the present invention, a transformer 314 includes a plurality of secondary winding $N_{S1}$ to $N_{SN}$, a current balance unit 340 includes a plurality of current balance unit elements 341 to 34N, and each of the plurality of current balance unit elements 341 to 34N may be electrically connected a plurality of corresponding secondary windings $N_{S1}$ to $N_{SN}$. Each of the plurality of current balance unit elements 341 to 34N may be the same as the configuration of the current balance unit 240 shown in FIG. 2 and the detailed description thereof will be omitted. In addition, the resonance capacitance C may be different from the positions shown in FIGS. 1 and 2, but does not affect the LLC resonance and the description of the leakage inductance $L_{lkg}$ will be omitted.

Meanwhile, the configuration and function of the rectifying and smoothing unit 311, the power factor correction unit 312, and the switching unit 313 in the power supplier 310, the driver 320 having the switching unit 321 and the controller 322, and the transfer unit 330 are the same as the description of FIG. 1 and therefore, the detailed description thereof will be omitted.

Figure 4:
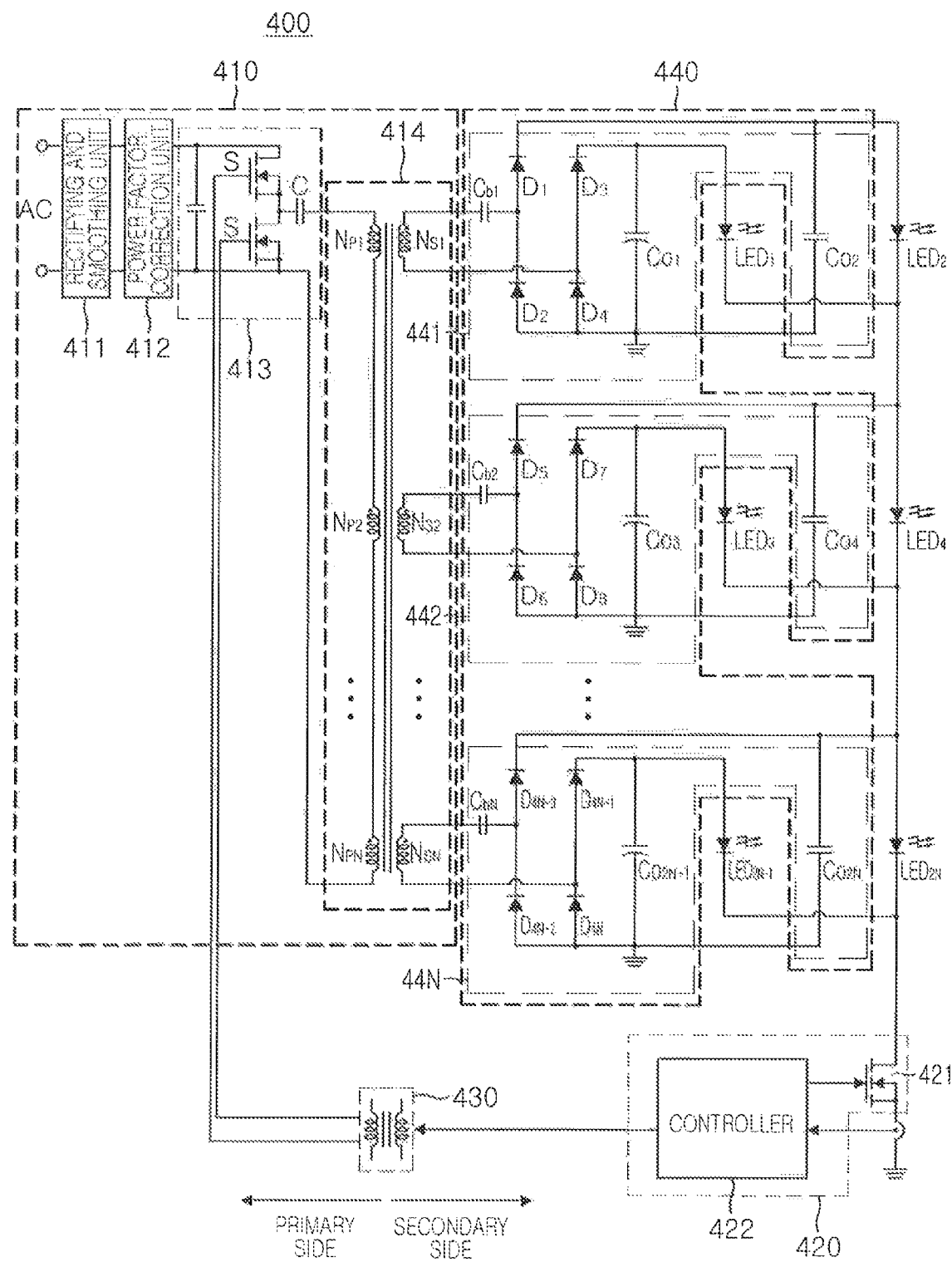
FIG. 4 is a schematic configuration diagram of a light emitting diode driver according to a fourth exemplary embodiment of the present invention.

FIG. 4 is a schematic configuration diagram of a light emitting diode driver according to a fourth exemplary embodiment of the present invention.

Referring to FIG. 4, in a light emitting diode driver 400 according to the fourth exemplary embodiment of the present invention, a transformer 414 includes a plurality of primary windings $N_{P1}$ to $N_{PN}$ and a plurality of secondary windings $N_{S1}$ to $N_{SN}$, wherein the plurality of primary windings $N_{P1}$ to $N_{PN}$ one-to-one corresponds to the plurality of secondary windings $N_{S1}$ to $N_{SN}$. The current balance unit 440 includes a plurality of current balance unit elements 441 to 44N and each of the plurality of current balance unit elements 441 to 44N may be electrically connected to the plurality of corresponding secondary windings $N_{S1}$ to $N_{SN}$. Each of the plurality of current balance unit elements 441 to 44N may be the same as the configuration of the current balance unit 240 shown in FIG. 2 and the detailed description thereof will be omitted.

Meanwhile, the configuration and function of the rectifying and smoothing unit 411, the power factor correction unit 412, and the switching unit 413 in the power supplier 410, the driver 420 having the switching unit 421 and the controller 422, and the transfer unit 430 are the same as the description of FIG. 1 and therefore, the detailed description thereof will be omitted.

Figure 6:
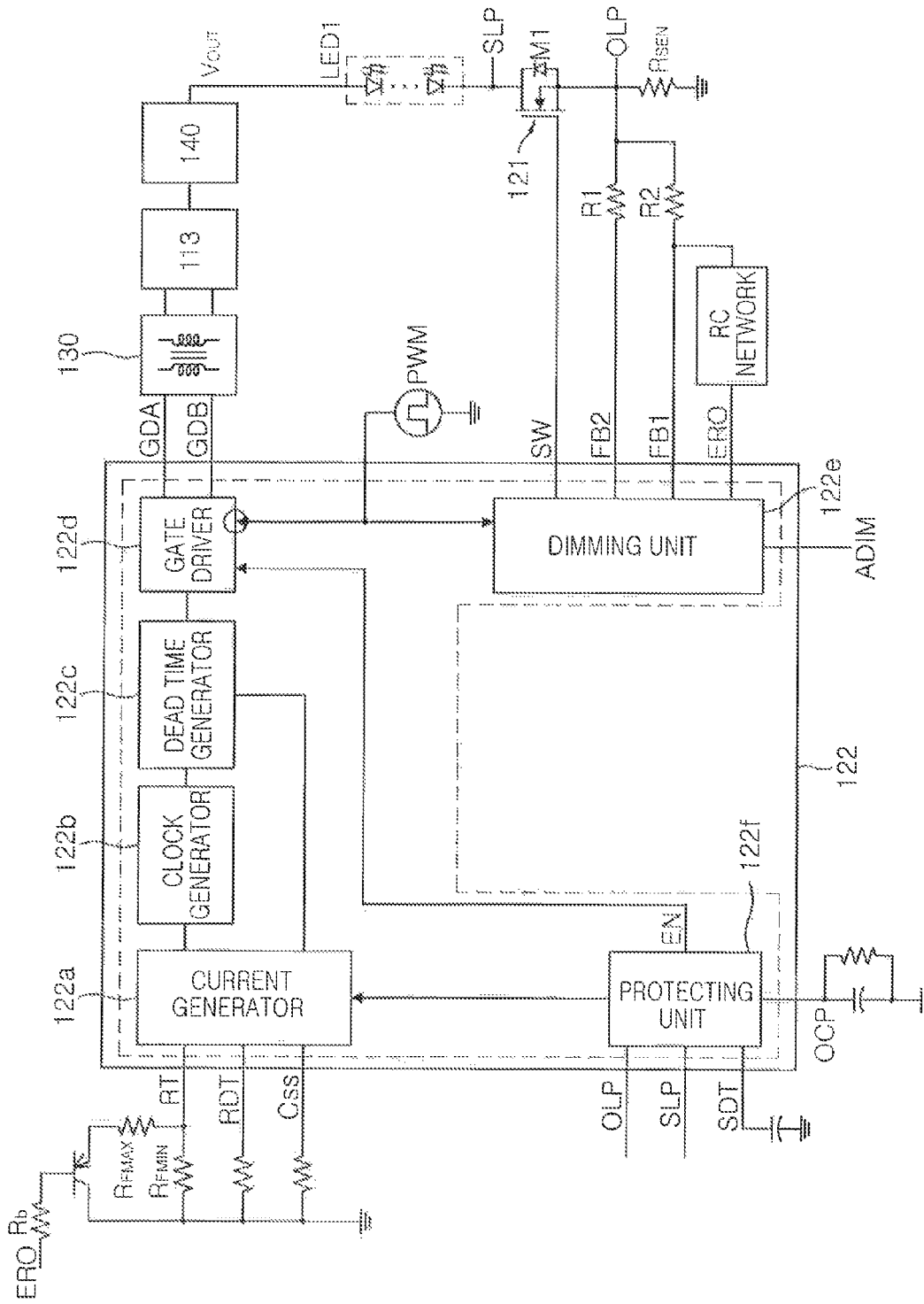
FIG. 6 is a schematic configuration diagram of a controller used in the used in the light emitting diode driver of the exemplary embodiment of the present invention.
Figure 7:
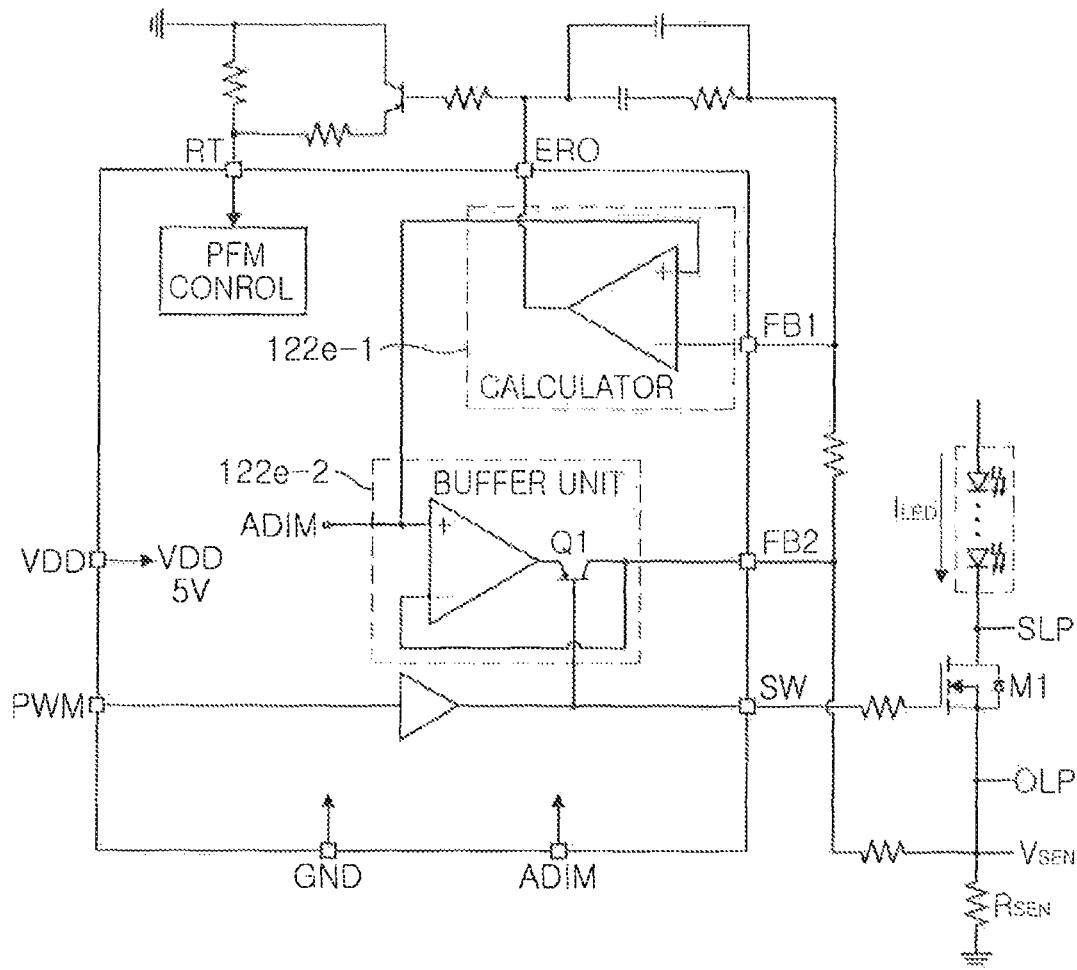
FIG. 7 is a partially enlarged diagram of the controller used in the used in the light emitting diode driver of the exemplary embodiment of the present invention.

FIG. 6 is a schematic configuration diagram of a controller used in the used in the light emitting diode driver of the exemplary embodiment of the present invention and FIG. 7 is a partially enlarged diagram of the controller used in the used in the light emitting diode driver of the exemplary embodiment of the present invention.

Referring to FIG. 6, the controller used in the light emitting diode driver according to the exemplary embodiment of the present invention may be commonly used in the light emitting diode derivers 100, 200, 300, and 400 according to the exemplary embodiments of the present invention and therefore, the controller 122 of FIG. 1 will be described.

The controller 122 may be configured to include a current generator 122a, a clock generator 122b, a dead time generator 122c, a gate driver 122d, a dimming unit 1223, and a protecting unit 122f.

The current generator 122a may generate the current having a level set according the state of the driving power supplied to the light emitting diode channel LED1 and the clock generator 122b may generate the clock signal having a period set according to the current generated by the current generator 122a.

The dead time generator 122c generates a dead time for controlling the switching of the switching unit 113 based on the current level generated by the current generator 122a and the clock signal generated by the clock generator 122b and the gate driver 122d generates the switching control signal having the dead time generated by the dead time generator 122c based on a pulse width modulation (PWM) signal from the outside, which may be transferred to the switching unit 113 through the transfer unit 130.

The dimming unit 122e may supply the switching signal SW controlling the supply and interruption of the driving power to the light emitting diode channel LED1 based on the PWM signal supplied to the gate driver 122d or the analog dimming signal ADIM from the outside. To this end, the dimming unit 122e may receive the driving power supplied to the light emitting diode channel LED1, which is detected by a detection resistor $R_{SEN}$, as first and second feedback signals FB1 and FB2 through resistors R1 and R2.

In addition, the dimming unit 122e may receive the driving power supplied to the light emitting diode channel LED1 as an error signal ER0 by the resistor R2 and an RC network. The above-mentioned error signal. ER0 is transferred to the current generator 122a to be associated with the current generation.

The protection unit 122f determines the normal or abnormal operation according to the voltage and current states SEP and OLP of the power supplied to the light emitting diode channel LED1, thereby stopping the operations of the current generator 122a and the gate driver 122d at the time of the abnormal operation.

Meanwhile, referring to FIG. 7, the dimming unit 122e may include a calculator 122e-1 and a buffer unit 122e-2, and the calculator 122e-1 may receive a feedback signal FB1 having the current level of the driving power supplied to the light emitting diode channel LED1 by the voltage level $V_{SEN}$ of the driving power supplied to the light emitting diode channel LED1 detected by the detection resistance $R_{SEN}$.

The calculator 123e-1 varies a frequency according to the level of the feedback signal FB1 to control pulse frequency modulation (PFM).

Describing the operation, when the PWM signal from the outside is high, the switch M1 of the switching unit 121 is in the turned-on state to transfer the feedback signal FB1 to the calculator 122e-1, thereby controlling the current (RT) generation of the current generator 122a. In this case, the switch Q1 of the buffer unit 122e-2 is turned-off such that the operation is not performed.

When the PWM signal is low, the switch M1 of the switching unit 121 is in the turned-off state and the switch Q1 of the buffer unit 122e-2 is turned-on to maintain the voltage level of the error signal ER0 as the voltage level of the analog dimming signal ADIM, thereby such that the voltage level of the error signal ER0 may be set through the analog dimming signal ADIM even when the PWM signal is low, similar to the level of the feedback signal FB1.

Figure 8A:
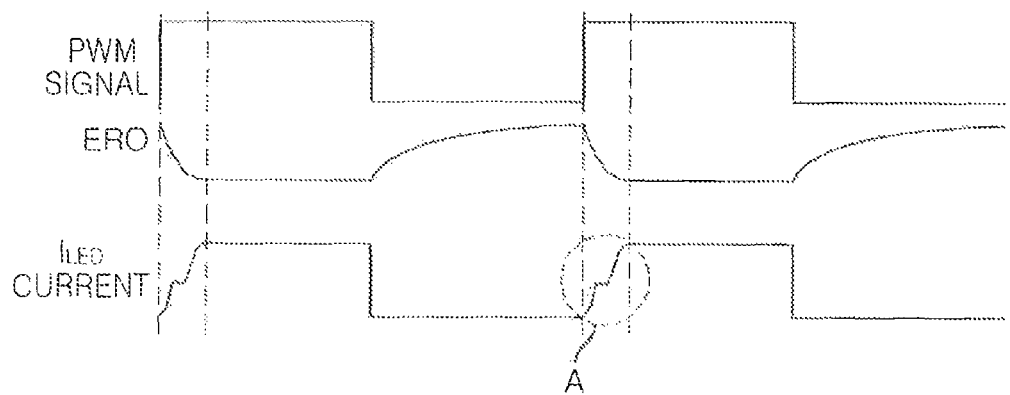
FIGS. 8A and 9A are graphs showing electrical characteristics of a general light emitting diode driver and FIGS. 8B and 9B are graphs showing electrical characteristics of the light emitting diode driver according to the exemplary embodiment of the present invention.
Figure 8B:
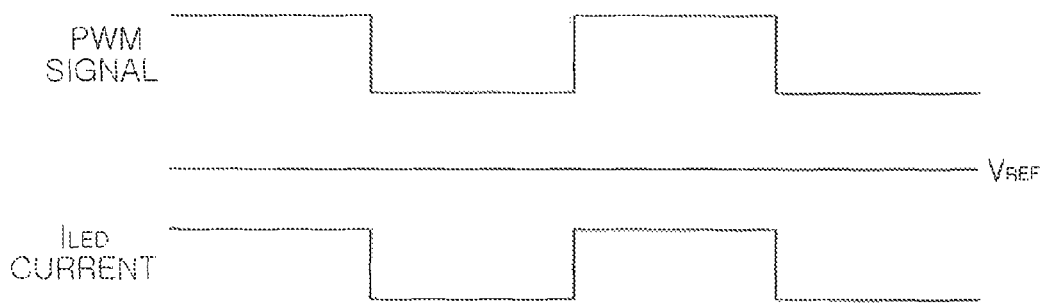
Figure 9A:
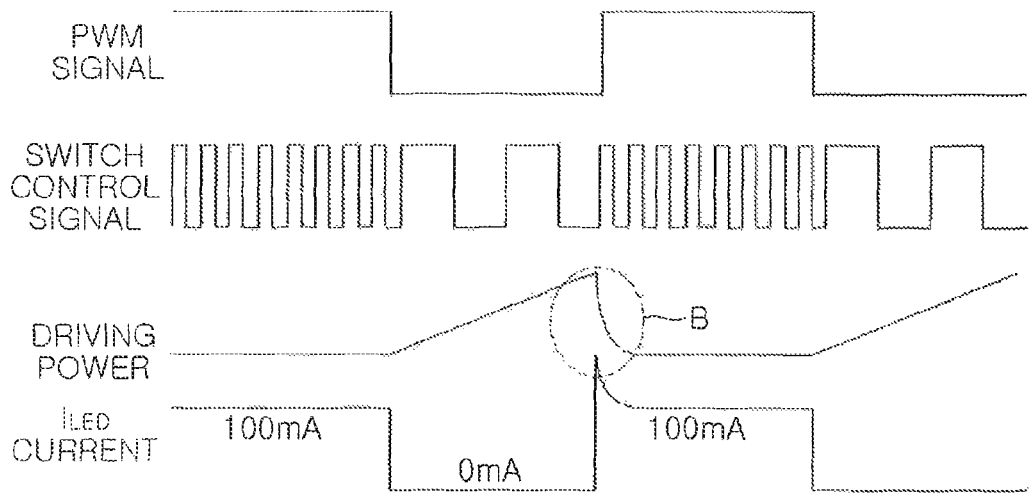
Figure 9B:
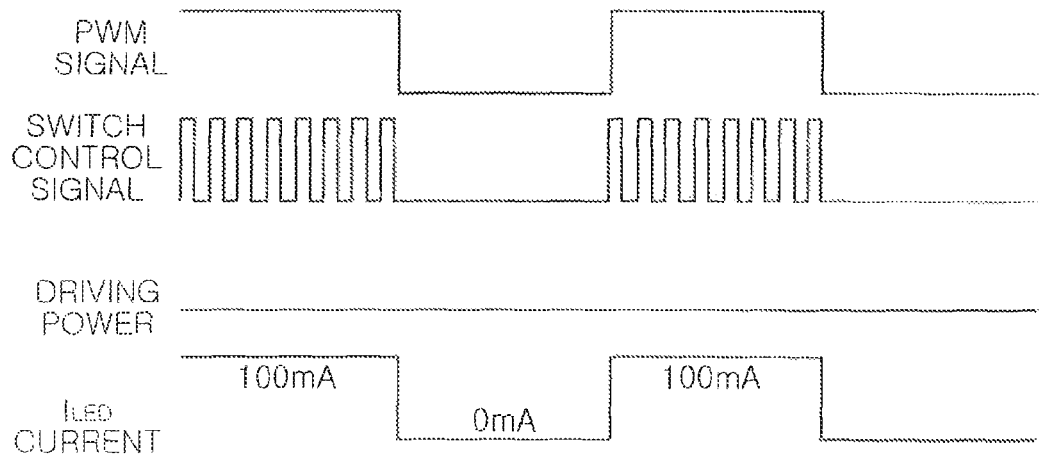

FIGS. 8A and 9A are graphs showing electrical characteristics of a general light emitting diode driver and FIGS. 8B and 9B are graphs showing electrical characteristics of the light emitting diode driver according to the exemplary embodiment of the present invention.

Meanwhile, when the feedback level signal is transferred, the phenomenon that the current level rises as in identification sign A of FIG. 8A due to the external resistance and the capacitor component of the calculator 122e-1 occurs.

However, in the dimming unit 122e of the exemplary embodiment of the present invention, even when the PWM signal is low, the voltage level of the error signal ER0 is constantly maintained as in a period of a high signal of the PWM signal, such that the rising time of the current $I_{LED}$ flowing in the light emitting diode channel LED1 can be shortened as shown in FIG. 8B even when the PWM signal is dimmed-on in the low level, the dimming-off.

In the LLC power conversion manner, the switching control signal S is operated at a low frequency at the time of no-load to increase the gain of the output voltage. As a result, when the PWM signal is low, the output voltage $V_{OUT}$ is increased. The increase in the output voltage leads to instantaneously increase the current (LED current) flowing in the light emitting diode channel LED1 as in identification sign B of FIG. 9A when the PWM signal is high. As a result, in the exemplary embodiment of the present invention, when the PWM signal is low, the output of the switching control signal is turned-off to maintain the output voltage $V_{OUT}$, thereby stably maintaining the current (LED current) level flowing in the light emitting diode channel LED1 as shown in FIG. 9B.

In addition, the controller 122 is formed at the secondary side, such that the power control circuit is generally formed at the primary side to exclude the use of the photo coupler for transferring the power state generated at the secondary side to the primary side.

Figure 10:
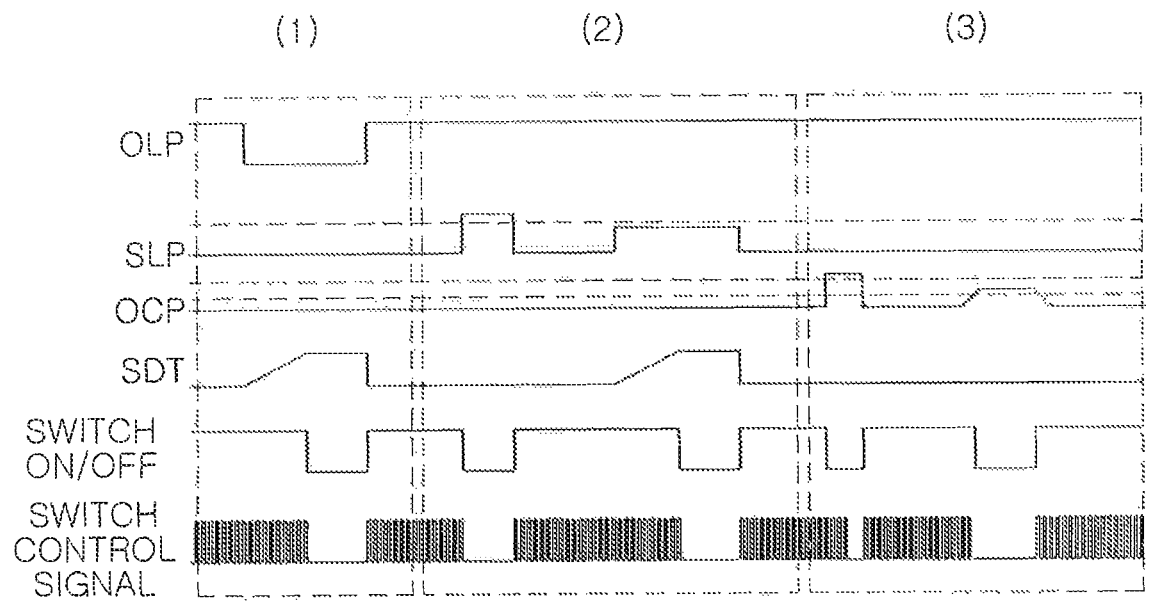
FIG. 10 is a signal waveform graph of main components of the light emitting diode driver according to the exemplary embodiment of the present invention.

FIG. 10 is a signal waveform graph of main, components of the light emitting diode driver according to the exemplary embodiment of the present invention.

When any abnormal operation is applied at a normal operation as in identification sign (1), (2), and (3), it can be appreciated from FIG. 10 that the protection operation may be easily made. That is, as in identification sign (1), the voltage of the switch M1 of the switching unit 121 falls to a predetermined voltage or less to charge the capacitor of an SDT when an over LED protection (OLP) voltage level is low, such that it can be appreciated that the protection function may be operated when the charged voltage level is a predetermined level or more of about 0.7V. In identification signal (2), when the drain voltage of the switch M1 is a predetermined voltage or more of about 4V as the case in which the channel is short-circuited (short LED protect ion (SLP)), a latch-shutdown is immediately made and when the drain voltage of the switch M1 is 3V or more, the capacitor for shut-down time (SDT) is charged, such that it can be appreciated that the protection function is operated (short LED protection (SLP)) when the drain voltage is a predetermined voltage or more. In identification signal (3), when overcurrent occurs at the primary side, the output of the switching control signal S stops when the over current protection (OCP) voltage is a predetermined voltage level of about 2V, such that it can be appreciated that the protection function is operated.

Figure 11A:
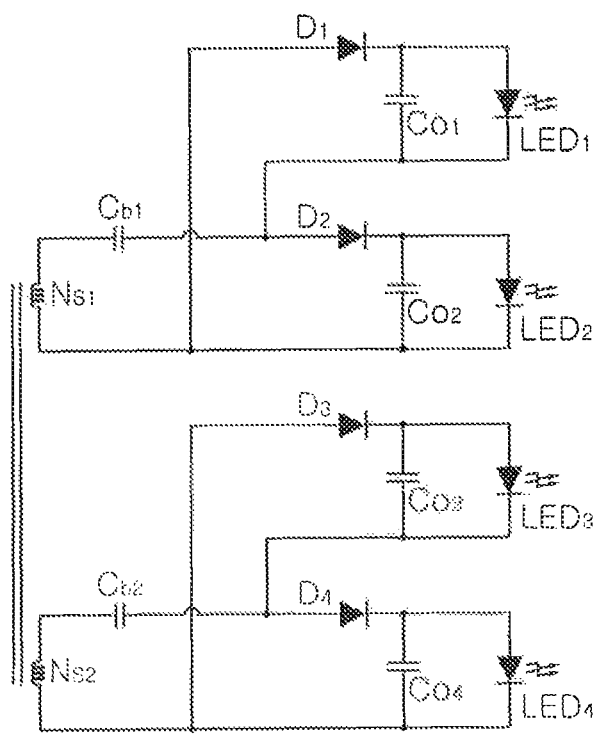
FIGS. 11A and 11B are schematic configuration diagrams of examples of a current balance unit used in the light emitting diode driver of the exemplary embodiment of the present invention.
Figure 11B:
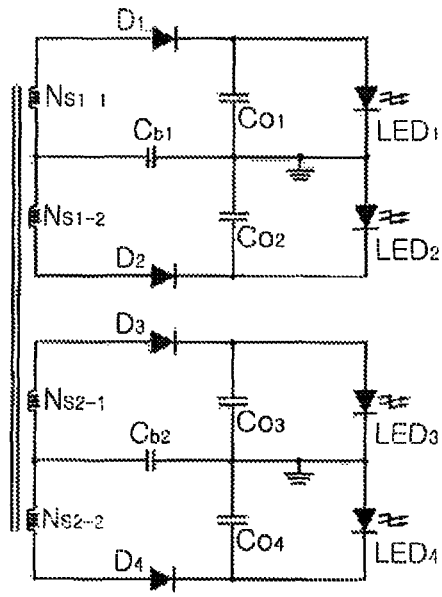

Meanwhile, FIGS. 11A and 11B are schematic configuration diagrams of examples of a current balance unit used in the light emitting diode driver of the exemplary embodiment of the present invention;

Referring to FIG. 11A, a first current balance unit element may be configured to include a first diode D1 and a second diode D2, the first current balance capacitor Cb1 is electrically connected between one end of a first secondary winding NS1 and an anode of the second diode D2, an anode of the first diode D1 is electrically connected to the other end of the first secondary winding $N_{S1}$, a cathode of the first diode D1 is electrically connected to one end of the first stabilization capacitor Co1 and one end of the first light emitting diode channel LED1, the anode of the second diode D2 is electrically connected to the other end of the first stabilization capacitor Co1 and the first light emitting diode channel LED1 together with the first current balance capacitor Cb1, the cathode of the second diode D2 is electrically connected to one end of the second stabilization capacitor Co2 and one end of the second light emitting diode channel LED2, and the other end of the second stabilization capacitor Co2 and the other end of the second light emitting diode channel LED2 may be electrically connected to the other end of the first secondary winding NS1. As described above, only the first current balance unit element is described, but the second current balance unit including the second current balance capacitor Cb2, the third and fourth diodes D3 and D4, and the third and fourth stabilization capacitors Co3 and Co4 may have the same configuration as the first current balance unit element. The current balance unit element may be provided in plural.

Referring to FIG. 11B, the first current balance unit element includes the first diode D1 and the second diode D2, the first secondary winding $N_{S1}$ is separately wound to include a center tap, the first current balance capacitor Cb1 is connected between the center tap of the first secondary winding NS1 and the ground, the anode of the first diode D1 is electrically connected, to one end of the first secondary winding $N_{S1}$, the cathode of the first diode D1 is electrically connected to one end of the first stabilization capacitor Co1 and one end of the first light emitting diode channel LED1, the anode of the second diode D2 is electrically connected to the other end of the first secondary winding $N_{S1}$, the cathode of the second diode D2 is electrically connected to one end of the second stabilization capacitor Co2 and one end of the second light emitting diode channel LED2, and the other end of the first and second stabilization capacitors Co1 and Co2 and the other end of the first and second light emitting diodes LED1 and LED2 may be ground. Similarly, only the first current balance unit element is described above, but the second current balance unit element including the second current balance capacitor Cb2, the third and fourth diodes D3 and D4, and the third and fourth, stabilization capacitors Co3 and Co4 may have the same configuration as the first current balance unit element. The current balance unit element may be provided in plural.

Figure 12A:
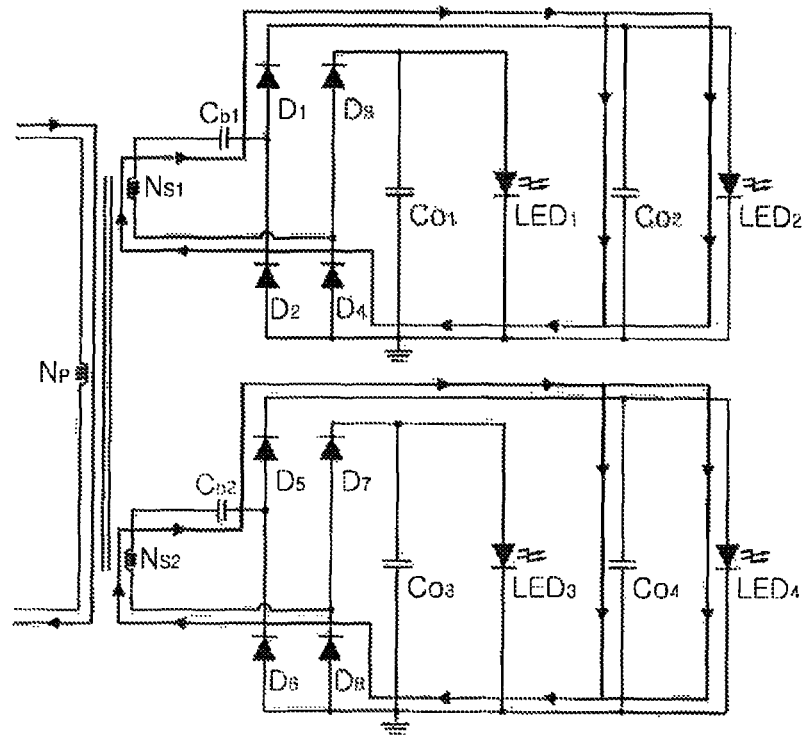
FIGS. 12A and 12B are a current flow diagram showing an operation of a current balance unit used in the light emitting diode driver of the exemplary embodiment of the present invention.
Figure 12B:
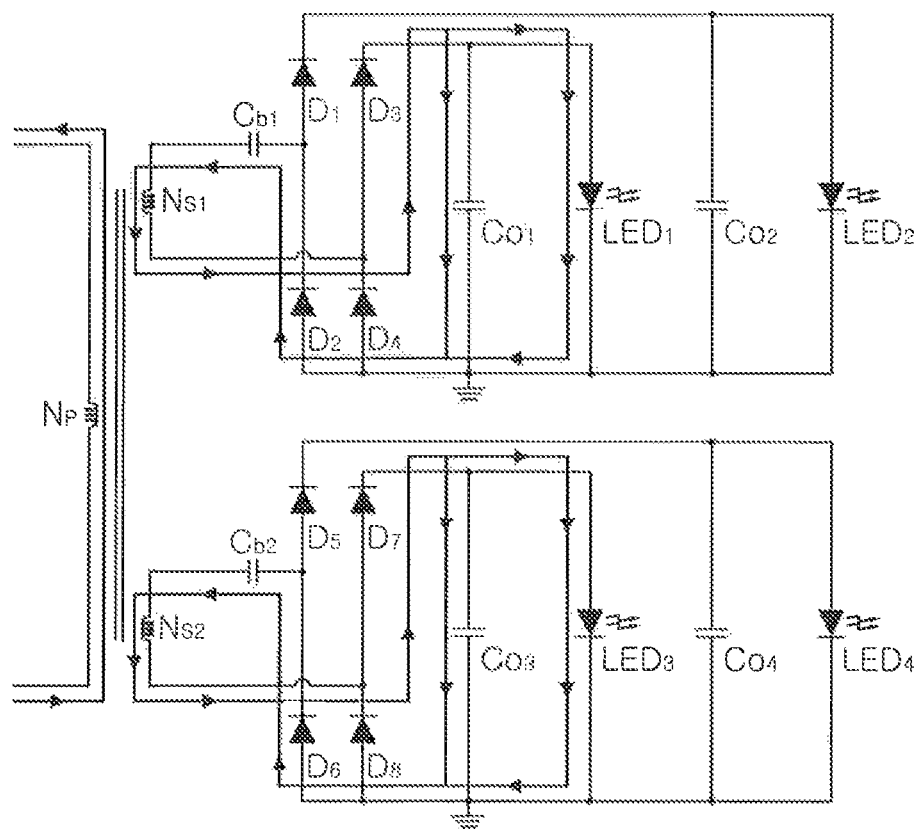

FIGS. 12A and 12B are a current flow diagram showing an operation of the current balance unit used in the light emitting diode driver of the exemplary embodiment of the present invention.

The current flowing in the primary winding $N_P$ according to the switching of the switching unit 113 alternately flows forward (FIG. 12A) and reverse (FIG. 12B). In this case, in order to equalize the electromagnetic coupling between the first and second secondary windings $N_{S1}$ and $N_{S2}$ and the primary winding $N_P$, when the tarn ratio between the first and second secondary windings $N_{S1}$ and $N_{S2}$ are the same, the positive power current Isec1_P and Isec2_P may approximate to each other in the case of the forward.

$$Isec1\_P \approx Isec2\_P \; (*P \text{ Positive}) \qquad \text{[Equation 1]}$$

Similarly, in the case of the reverse, the current Isec1_N and Isec2_N of the negative power of the first and second secondary windings $N_{S1}$ and $N_{S2}$ approximates to each other as the following Equation 2.

$$Isec1\_N \approx Isec2\_N \; (*N: \text{Negative}) \qquad \text{[Equation 2]}$$

In this case, each rectifier may include one of the current balance capacitors Cb1 and Cb2. As shown in FIGS. 12A and 12B, the forward and reverse current conduction paths are formed and the power supplied to the first and third light emitting diode channels LED1 and LED3 and the second and fourth light emitting diode channels LED2 and LED4 according to the charge balance law of the current balance capacitors Cb1 and Cb2 may approximate to each other as the following Equations 3 and 4 (charge balance principle is a known art and the detailed description thereof will be omitted)

$$Isec1,2\_P \approx Isec1,2\_N \qquad \text{[Equation 3]}$$

$$Isec1\_P \approx Isec2\_P \approx Isec1\_N \approx Isec2\_N \qquad \text{[equation 4]}$$

That is, the current of the driving power supply supplied to the first to fourth light emitting diode channels LED1 to LED4 may be constantly maintained.

As various exemplary embodiments of the above-mentioned configuration, when a single transformer includes N secondary windings of which the turn number is the same, the current balance of the driving power supplied to at least 2N light emitting diode lamps is maintained according to the charge balance law of N current balance capacitors provided corresponding to each secondary winding, such that a constant current may flow in each, light emitting diode lamp.

As set forth, above, the exemplary embodiment of the present invention integrates the switching control circuit formed at the primary side and the light emitting diode control circuit formed at the secondary side, thereby reducing the manufacturing costs without using the photo coupler.

As set forth above, the exemplary embodiment of the present invention integrates the light emitting diode control function and the power switching control function at the secondary side to control the power switching of the primary side, thereby reducing the manufacturing costs, facilitating the circuit, design, preventing the current rising delay, and suppressing the current spike components.

While the present invention has been shown and described in connection with one exemplary embodiments, it will be apparent to those skilled in the art that modifications and variations can be made without departing from the spirit and scope of the invention as defined by the appended claims.

What is claimed is:

1. A light emitting diode driver, comprising:
a power supplier including a primary side and a secondary side electrically insulated from each other and configured to
switch an input power at the primary side,
convert the switched power into a driving power having a previously set voltage level at the secondary side, and
supply the driving power to at least one light emitting diode (LED) channel;
a driver configured to
control supply and interruption of the driving power to the at least one LED channel from the power supplier to drive the at least one LED channel, and
control switching of the power supplier according to a state of the driving power supplied to the at least one LED channel; and
a transfer unit configured to transfer a switching control signal for controlling the switching of the power supplier from the driver, from the secondary side to the primary side of the power supplier, wherein
the driver includes:
a switch unit connected between the at least one LED channel and a ground and configured to switch the supply or interruption of the driving power to the at least one LED channel; and
a controller configured to
detect the state of the driving power supplied to the at least one LED channel to control the switching of the switching unit,
generate the switching control signal according to the state of the detected driving power, and
transfer the generated switching control signal to the transfer unit.

2. The light emitting diode driver of claim 1, wherein the controller includes:
a current generator configured to generate a current according to the state of the detected driving power;
a clock generator configured to generate a clock signal having a period set according to the current generated by the current generator;
a dead time generator configured to generate a dead time of the clock signal generated by the clock generator according to the current generated by the current generator;
a gate driver configured to process the clock signal having the dead time generated by the dead time generator to control the switching of the power supplier, and
transfer the processed clock signal to the transfer unit;
a dimming unit configured to control the switching of the switching unit according to the state of the detected driving power to control luminance of the at least one LED channel; and
a protection unit configured to interrupt an operation of the gate driver when the state of the detected driving power corresponds to a previously set abnormal operation.

3. The light emitting diode driver of claim 2, wherein the dimming unit includes:
a calculator configured to receive the state of the detected driving power as a detection signal to calculate a current control signal transferred to the current generator when a pulse width modulation (PWM) signal turning-on and turning-off the switch unit is a high signal; and
a buffer unit configured to control a a voltage level of the detection signal to a previously set voltage level when the PWM signal is a low signal.

4. The light emitting diode driver of claim 1, wherein the transfer unit is a pulse transformer including
a first winding configured to receive the switching control signal from the gate driver, and
a second winding electrically insulated from the first winding and configured to receive the switching control signal input to the first winding to transfer the received switching control signal to the power supplier.

5. The light emitting diode driver of claim 1, further comprising a rectifier configured to
rectify the driving power from the power supplier, and
supply the rectified driving power to the at least one LED channel.

6. The light emitting diode driver of claim 1, wherein the power supplier is configured to supply the driving power to each of first and second LED channels of at least one LED channel block having the first and second LED channels.

7. The light emitting diode driver of claim 6, further comprising a current balance unit having at least one current balance unit element configured to maintain a current balance in the driving power supplied to each of the first and second LED channels.

8. The light emitting diode driver of claim 7, wherein the at least one current balance unit element includes:
a current balance capacitor configured to maintain the current balance between the driving power transferred to each of the first and second LED channels according to a charge balance law;
first and second diodes connected between the first LED channel and a ground in series and configured to rectify the driving power;
third and fourth diodes connected between the second LED channel and the ground in series and configured to rectify the driving power;
a first stabilization capacitor connected to the first and second diodes in parallel and configured to stabilize the driving power supplied to the first LED channel; and
a second stabilization capacitor connected to the third and fourth diodes in parallel and configured to stabilize the driving power supplied to the second LED channel.

9. The light emitting diode driver of claim 8, wherein the power supplier includes:
a rectifying and smoothing unit configured to rectify and smooth a commercial power;

a power factor correction unit configured to adjust a phase difference between voltage and current of the rectified power from the rectifying and smoothing unit;

a switching unit configured to switch power of which power factor is corrected from the power factor correction unit according to the switching control signal; and a transformer having at least one primary winding configured to receive the switched power from the switching unit and at least one secondary winding insulated from the at least one primary winding and configured to receive the power from the at least one primary winding by forming a previously set turn ratio.

10. The light emitting diode driver of claim 9, wherein the transformer includes a plurality of secondary windings respectively connected to a plurality of LED channel blocks and configured to supply the driving power to a corresponding LED channel block, and the current balance unit includes a plurality of current balance unit elements of the same type as the current balance unit element configured to
maintain the driving power from the plurality of secondary windings in a current balance state, and
supply the current balanced driving power to the first LED channel and the second LED channel of a corresponding LED channel block.

11. The light emitting diode driver of claim 9, wherein the transformer includes a plurality of primary windings respectively corresponding to the plurality of secondary windings.

12. The light emitting diode driver of claim 1, wherein the power supplier is configured to supply the driving power to each of first and second LED channels of at least one LED channel block having the first and second LED channels, and the power supplier includes:
a rectifying and smoothing unit configured to rectify and smooth a commercial power;
a power factor correction unit configured to adjust a phase difference between voltage and current of the rectified power from the rectifying and smoothing unit;
a switching unit configured to switch power of which power factor is corrected from the power factor correction unit according to the switching control signal;
a transformer having at least one primary winding configured to receive the switched power from the switching unit and at least one secondary winding that is insulated from the at least one primary winding and configured to receive the power from the at least one primary winding by forming a previously set turn ratio; and
a current balance unit having at least one current balance unit element configured to maintain a current balance in the driving power supplied to each of the first and second LED channels.

13. The light emitting diode driver of claim 12, wherein the at least one current balance unit element includes:
a current balance capacitor connected to one end of the secondary winding and configured to maintain current balance between the driving power transferred to each of the first and second LED channels, according to a charge balance law;
a first diode connected between the other end of the secondary winding and the first LED channel and configured to rectify the driving power;
a second diode connected between the current balance capacitor and the second LED channel and configured to rectify the driving power;

a first stabilization capacitor connected to the first LED channel in parallel and configured to stabilize the driving power; and
a second stabilization capacitor connected to the second LED channel in parallel and configured to stabilize the driving power.

14. The light emitting diode driver of claim 12, wherein the secondary winding is separated into a previously set turn number based on a center tap,
the first LED channel and the second LED channel are connected in series, and
the at least one balance unit element includes:
a current balance capacitor connected to the center tap of the secondary winding and a connection point of the first and second LED channels and configured to maintain the current balance between the driving power transferred to the first and second LED channels, respectively;
a first diode connected between one end of the secondary winding and the first LED channel and configured to rectify the driving power;
a second diode connected between the other end of the secondary winding and the second LED channel and configured to rectify the driving power;
a first stabilization capacitor connected to the first LED channel in parallel and configured to stabilize the driving power; and
a second stabilization capacitor connected to the second LED channel in parallel and configured to stabilize the driving power.

15. The light emitting diode driver of claim 13, wherein the transformer includes a plurality of secondary windings respectively connected to a plurality of LED channel blocks and configured to supply the driving power to a corresponding LED channel block, and
the current balance unit includes a plurality of current balance unit elements of the same type as the current balance unit element configured to
maintain the driving power from the plurality of secondary windings in a current balance state, and
supply the current balanced driving power to the first LED channel and the second LED channel of a corresponding LED channel block.

16. The light emitting diode driver of claim 15, wherein the transformer includes a plurality of primary windings respectively corresponding to the plurality of secondary windings.

17. The light emitting diode driver of claim 14, wherein the transformer includes a plurality of secondary windings respectively connected to a plurality of LED channel blocks and configured to supply the driving power to a corresponding LED channel block, and
the current balance unit includes a plurality of current balance unit elements of the same type as the current balance unit element configured to
maintain the driving power from the plurality of secondary windings in a current balance state, and
supply the current balanced driving power to the first LED channel and the second LED channel of a corresponding LED channel block.

18. The light emitting diode driver of claim 17, wherein the transformer includes a plurality of primary windings respectively corresponding to the plurality of secondary windings.

19. A light emitting diode driver, comprising:
a rectifying and smoothing unit rectifying and smoothing commercial power;

a power factor correction unit adjusting a phase difference between voltage and current of the rectified power from the rectifying and smoothing unit;

a switching unit switching the power of which power factor is corrected from the power factor correction unit according to the switching control signal;

a transformer having at least one primary winding that receives the switched power from the switching unit and at least one secondary winding that is electrically insulated from at least one primary winding and receives the power from the at least one primary winding by forming a previously set turn ratio;

a current balance unit having at least one current balance unit element that maintains current balance in a driving power supplied to each of first and second LED channels of at least one LED channel block having the first and second LED channels;

a switch unit connected between the at least one LED channel and a ground to switch a supply or an interruption of the driving power to the at least one LED channel; and a controller detecting a state of the driving power supplied to the at least one LED channel to control the switching of the switch unit and generating the switching control signal according to the state of the detected driving power and to transfer the generated switching control signal to the transfer unit; and a transferring unit having a pulse transformer including a first winding that receives the switching control signal controlling the switching of the power supplier from the controller and a second winding that is electrically insulated from the first winding and receives the switching control signal input to the first winding to transfer the received switching control signal to the switching unit.

20. The light emitting diode driver of claim 19, wherein the controller includes:

a current generator generating a current according to the state of the detected driving power;

a clock generator generating a clock signal having a period set according to the current generated by the current generator;

a dead time generator generating a dead time of the clock signal generated by the clock generator according to the current generated by the current generator;

a gate driver processing the clock signal having the dead time generated by the dead time generator to control the switching of the power supplier and transferring the processed clock signal to the transfer unit;

a dimming unit controlling the switching of the switch unit according to the state of the detected driving power to control luminance of the at least one LED channel; and a protection unit interrupting an operation of the gate driver when the state of the detected driving power corresponds to a previously set abnormal operation.

21. The light emitting diode driver of claim 20, wherein the dimming unit includes:

a calculator receiving the state of the detected driving power as a detection signal to calculate a current control signal transferred to the current generator when a pulse width modulation (PWM) signal turning-on and turning-off the switch unit is a high signal; and a buffer unit controlling a voltage level of the detection signal to a previously set voltage level when the PWM signal is a low signal.

22. The light emitting diode driver of claim 21, wherein the at least one current balance unit element includes:

a current balance capacitor maintaining current balance between the driving power transferred to each of the first and second LED channels according to a charge balance law;

first and second diodes connected between the first LED channel and a ground in series to rectify the driving power;

third and fourth diodes connected between the second LED channel and the ground in series to rectify the driving power;

a first stabilization capacitor connected to the first and second diodes in parallel to stabilize the driving power supplied to the first LED channel; and a second stabilization capacitor connected to the third and fourth diodes in parallel to stabilize the driving power supplied to the second LED channel.

23. The light emitting diode driver of claim 21, wherein the at least one current balance unit element includes:

a current balance capacitor connected to one end of the secondary winding to maintain current balance between the driving power transferred to each of the first and second LED channels, according to a charge balance law;

a first diode connected between the other end of the secondary winding and the first LED channel to rectify the driving power;

a second diode connected between the current balance capacitor and the second LED channel to rectify the driving power;

a first stabilization capacitor connected to the first LED channel in parallel to stabilize the driving power; and a second stabilization capacitor connected to the second LED channel in parallel to stabilize the driving power.

24. The light emitting diode driver of claim 21, wherein the secondary winding is separated into a previously set turn number based on a center tap, the first LED channel and the second LED channel are connected in series, and the at least one balance unit element includes:

a current balance capacitor connected to the center tap of the secondary winding and connected to a connection point of the first and second LED channels to maintain the current balance between the driving power transferred to the first and second LED channels, respectively;

a first diode connected between one end of the secondary winding and the first LED channel to rectify the driving power;

a second diode connected between the other end of the secondary winding and the second LED channel to rectify the driving power;

a first stabilization capacitor connected to the first LED channel in parallel to stabilize the driving power; and a second stabilization capacitor connected to the second LED channel in parallel to stabilize the driving power.

25. The light emitting diode driver of claim 22, wherein the transformer includes a plurality of secondary windings, the secondary windings respectively connected to a plurality of LED channel blocks, and supplying the driving power to a corresponding LED channel block, and the current balance unit including the current balance unit element provided in plural to maintain the driving power from the plurality of secondary windings in a current balance state and supply the current balanced driving power to the first LED channel and the second LED channel of a corresponding LED channel block.

26. The light emitting diode driver of claim 25, wherein the transformer includes a plurality of primary windings respectively corresponding to the plurality of secondary windings.

27. The light emitting diode driver of claim 24, wherein the transformer includes a plurality of secondary windings, the secondary windings respectively connected to a plurality of LED channel blocks, and supplying the driving power to a corresponding LED channel block, and the current balance unit including the current balance unit element provided in plural to maintain the driving power from the plurality of secondary windings in a current balance state and supply the current balanced driving power to the first LED channel and the second LED channel of a corresponding LED channel block.

28. The light emitting diode driver of claim 27, wherein the transformer includes a plurality of primary windings respectively corresponding to the plurality of secondary windings.

* * * * *